(12) United States Patent
Lyseggen et al.

(10) Patent No.: US 7,996,683 B2
(45) Date of Patent: Aug. 9, 2011

(54) SYSTEM, PORTABLE DEVICE AND METHOD FOR DIGITAL AUTHENTICATING, CRYPTING AND SIGNING BY GENERATING SHORT-LIVED CRYPTOKEYS

(75) Inventors: Jørn Lyseggen, Oslo (NO); Roar Andre Laurtizen, Oslo (NO); Kim Gunnar Støvring Øyhus, Oslo (NO)

(73) Assignee: Genkey AS, Oslo (NO)

( * ) Notice: Subject to any disclaimer, the term of this patent is extended or adjusted under 35 U.S.C. 154(b) by 1512 days.

(21) Appl. No.: 10/491,330

(22) PCT Filed: Oct. 1, 2002

(86) PCT No.: PCT/NO02/00352
§ 371 (c)(1),
(2), (4) Date: Dec. 21, 2004

(87) PCT Pub. No.: WO03/034655
PCT Pub. Date: Apr. 24, 2003

(65) Prior Publication Data
US 2006/0198514 A1    Sep. 7, 2006

(30) Foreign Application Priority Data
Oct. 1, 2001 (NO) .................................. 2001 4774

(51) Int. Cl.
*H04L 29/06* (2006.01)
*G06K 9/00* (2006.01)
*G06F 21/00* (2006.01)
(52) U.S. Cl. ............ 713/186; 340/5.52; 382/115; 726/5; 726/21; 726/28
(58) Field of Classification Search .................. None
See application file for complete search history.

(56) References Cited

U.S. PATENT DOCUMENTS
4,109,237 A   8/1978   Hill
4,135,147 A   1/1979   Riganati et al.
4,187,392 A   2/1980   Safford
(Continued)

FOREIGN PATENT DOCUMENTS
CN           1281608 A     1/2001
(Continued)

OTHER PUBLICATIONS
Claus et al., "Biometric Hash Based on Statistical Features of Online Signatures", Pattern Recognition, 2002. Proceedings.16th International Conference on Publication Date:2002. vol. 1, pp. 123-126.
(Continued)

*Primary Examiner* — Nasser Moazzami
*Assistant Examiner* — Fatoumata Traore
(74) *Attorney, Agent, or Firm* — Sherr & Vaughn, PLLC

(57) ABSTRACT

A system for authentication, encryption and/or signing, as well as corresponding devices and methods, that use temporary but repeatable encryption keys uniquely connected to the user and generated from a unique set of input parameters. The system comprises an input device (105) designed to extract predetermined characteristic values from value input by the user, which value is specific to the user, by means of a given algorithm, which algorithm is designed to remove the natural variation in the characteristic values in order to yield an identical set of characteristic values upon input of the same value, and a device (106) designed to generate at least one user specific encryption key comprising said characteristic values.

21 Claims, 4 Drawing Sheets

U.S. PATENT DOCUMENTS

Figure 1:
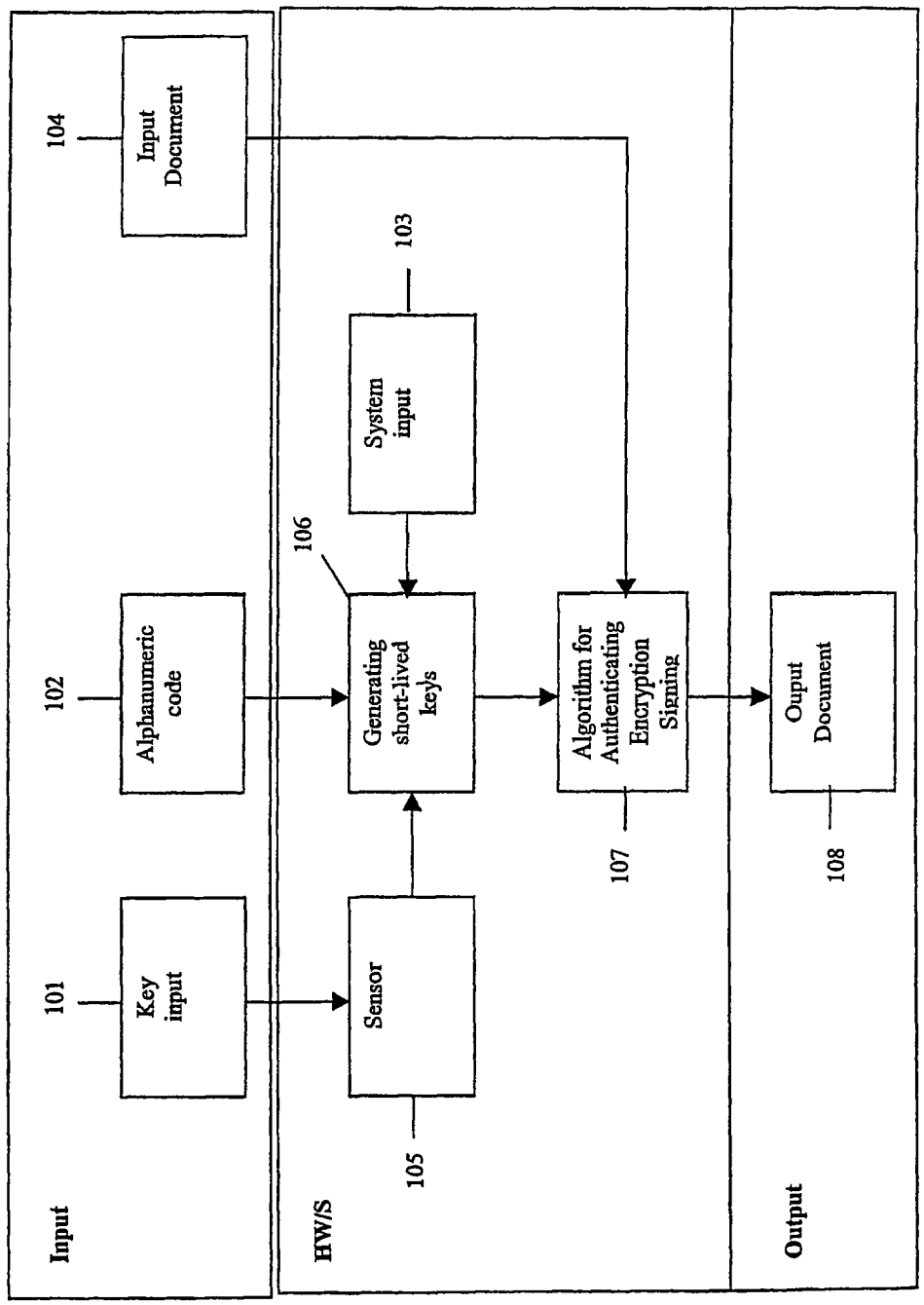

| | | | |
|---|---|---|---|
| 4,316,055 A | 2/1982 | Feistel | |
| 4,641,349 A | 2/1987 | Flom et al. | |
| 4,805,222 A | 2/1989 | Young et al. | |
| 5,067,162 A | 11/1991 | Driscoll et al. | |
| 5,291,560 A | 3/1994 | Daugman | |
| 5,347,580 A | 9/1994 | Molva et al. | |
| 5,497,430 A | 3/1996 | Sadovnik et al. | |
| 5,541,994 A | 7/1996 | Tomko et al. | |
| 5,680,460 A | 10/1997 | Tomko et al. | 380/23 |
| 5,680,470 A | 10/1997 | Moussa et al. | |
| 5,712,807 A | 1/1998 | Bangham | |
| 5,832,091 A | 11/1998 | Tomko et al. | |
| 5,933,516 A | 8/1999 | Tu et al. | 382/125 |
| 5,991,408 A | 11/1999 | Pearson et al. | |
| 6,035,398 A | 3/2000 | Bjorn | 713/186 |
| 6,038,315 A | 3/2000 | Strait et al. | 380/23 |
| 6,067,369 A | 5/2000 | Kamei | |
| 6,078,667 A | 6/2000 | Johnson | |
| 6,098,330 A | 8/2000 | Schmitt et al. | 42/70.11 |
| 6,154,285 A | 11/2000 | Teng et al. | |
| 6,170,073 B1 | 1/2001 | Jarvinen et al. | |
| 6,185,316 B1 | 2/2001 | Buffam | |
| 6,202,151 B1 | 3/2001 | Musgrave et al. | |
| 6,219,794 B1 | 4/2001 | Soutar et al. | |
| 6,330,674 B1 * | 12/2001 | Angelo et al. | 713/186 |
| 6,363,485 B1 | 3/2002 | Adams et al. | |
| 6,567,765 B1 | 5/2003 | Wu et al. | |
| 6,678,821 B1 | 1/2004 | Waugh et al. | |
| 6,687,375 B1 | 2/2004 | Matyas et al. | |
| 6,901,145 B1 | 5/2005 | Bohannon et al. | |
| 6,940,976 B1 * | 9/2005 | Matyas et al. | 380/44 |
| 6,957,337 B1 | 10/2005 | Chainer et al. | |
| 6,959,874 B2 | 11/2005 | Bardwell | |
| 6,968,459 B1 * | 11/2005 | Morgan et al. | 713/189 |
| 7,046,829 B2 | 5/2006 | Udupa et al. | |
| 7,200,549 B1 | 4/2007 | Fujii et al. | |
| 7,274,804 B2 | 9/2007 | Hamid | |
| 7,526,653 B1 | 4/2009 | Vogel et al. | |
| 2001/0025342 A1 | 9/2001 | Uchida | |
| 2002/0056040 A1 | 5/2002 | Simms | |
| 2002/0124176 A1 | 9/2002 | Epstein | |
| 2002/0174347 A1 | 11/2002 | Ting | |
| 2002/0199103 A1 | 12/2002 | Dube | |
| 2003/0179909 A1 | 9/2003 | Wong et al. | |
| 2003/0204732 A1 | 10/2003 | Audebert et al. | |
| 2003/0217264 A1 | 11/2003 | Martin et al. | |
| 2004/0107367 A1 | 6/2004 | Kisters | |
| 2004/0111625 A1 | 6/2004 | Duffy et al. | |
| 2004/0128502 A1 | 7/2004 | Royer | |
| 2004/0218762 A1 | 11/2004 | Le Saint et al. | |
| 2004/0243356 A1 | 12/2004 | Duffy et al. | |
| 2005/0021954 A1 | 1/2005 | Kung | |
| 2005/0246763 A1 | 11/2005 | Corcoran et al. | |
| 2006/0075255 A1 | 4/2006 | Duffy et al. | |
| 2006/0083372 A1 | 4/2006 | Chang et al. | |
| 2006/0090114 A1 | 4/2006 | Duffy et al. | |
| 2006/0153369 A1 | 7/2006 | Beeson | |
| 2006/0198514 A1 | 9/2006 | Lyseggen et al. | |
| 2006/0227974 A1 | 10/2006 | Haraszti | |
| 2008/0216147 A1 | 9/2008 | Duffy | |

FOREIGN PATENT DOCUMENTS

| | | |
|---|---|---|
| DE | 4243908 A1 | 6/1994 |
| DE | 19715644 A1 | 10/1998 |
| DE | 19936097 A1 | 2/2001 |
| EP | 0 779 595 A2 | 6/1997 |
| EP | 0779595 A2 | 6/1997 |
| EP | 0 786 735 A2 | 7/1997 |
| EP | 0786735 A2 | 7/1997 |
| JP | 9-161053 A | 6/1997 |
| WO | WO 98/48538 | 10/1998 |
| WO | WO 99/65175 | 12/1999 |
| WO | WO 00/14716 | 3/2000 |
| WO | WO 00/51280 | 8/2000 |
| WO | WO 00/65770 | 11/2000 |
| WO | WO 00/74301 A1 | 12/2000 |
| WO | WO 01/63385 A1 | 8/2001 |
| WO | WO 02/52480 A1 | 7/2002 |
| WO | WO 02/065693 A2 | 8/2002 |
| WO | WO 02/098053 A2 | 12/2002 |
| WO | WO 03/034655 A1 | 4/2003 |
| WO | WO 03/65169 A2 | 8/2003 |
| WO | WO 03/103216 A2 | 12/2003 |
| WO | WO 03/103217 A1 | 12/2003 |
| WO | WO 2004/006076 A2 | 1/2004 |
| WO | WO 2005/121921 A1 | 12/2005 |

OTHER PUBLICATIONS

Hao et al., "Combining Crypto with Biometrics Effectively", IEEE Transactions on Computers. Sep. 2006, pp. 1081-1088, vol. 55, No. 9, IEEE Computer Society.

Uludag et al., "Biometric Cryptosystems: Issues and Challenges", Proceedings of The IEEE. Jun. 2004, vol. 92, No. 6. pp. 948-960.

Monrose et al., "Cryptographic Key Generation From Voice", IEEE Symposium on Security and Privacy, 2001, pp. 202-213.

Riha et al. "Biometric Authentication Systems", FI MU Report Series, Nov. 2000. pp. 1-44, Faculty of Informatics Masaryk University.

Daugman, "High Confidence Visual Recognition of Persons by a Test of Statistical Independence", IEEE Transactions on Pattern Analysis and Machine Intelligence, vol. 15, No. 11, Nov. 1993, pp. 1148-1161.

Davida et al., "On the Relation of Error Correction and Cryptography to an Off Line Biometric Based Identification Scheme," Nov. 29, 1998, pp. 1-10.

Client Security in the Enterprise Network: Dell's Perspective, Dell Highlight, Feb. 2000, pp. 1-6.

Cavoukian et al., "Biometric Encryption: A Positive-Sum Technology that Achieves Strong Authentication", Security and Privacy, Mar. 2007, pp. 1-48, Information and Privacy Commissioner.

Clancy, Secure Smartcard-Based Fingerprint Authentication, WBMA'03, Nov. 8, 2003, pp. 45-52, Berkeley, California, USA.

UMTS 33.22 V1.0.0, 3GPP Systems and Services TSG, Security WG. Feb. 2-4, 1999, pp. 1-18.

Daugman, "How IRIS Recognition Works", IEEE Transactions on Circuits and Systems for Video Technology, vol. 14, No. 1. Jan. 2004, pp. 21-30, University of Cambridge, The Computer Laboratory, Cambridge CB2 3QG U.K. www.CL.Cam.ac.uk/users/jdg1000.

Mark, The Development of Destination-Specific Biometric Authentication. pp. 77-80, Year of Publication: 2000.

* cited by examiner

_US 7,996,683 B2_

SYSTEM, PORTABLE DEVICE AND METHOD FOR DIGITAL AUTHENTICATING, CRYPTING AND SIGNING BY GENERATING SHORT-LIVED CRYPTOKEYS

The present invention regards a system, a portable device and a method for digital authentication, encryption and signing by generation of temporary but consistent and repeatable encryption keys in accordance with the independent claims.

1 PREAMBLE

Authentication and transactions that are carried out by means of hand-held devices such as mobile telephones are becoming an increasing part of our lives. An example of this is the increasing use of mobile telephones to perform services that are invoiced directly in the telephone bill One of the challenges associated with today's systems is that fact that the authentication of the user is tied to a portable device. If an unauthorised person were to gain access to this, products and services may be purchased which are then charged to the owner of the device.

Newer forms of authentication/encryption, e.g. so-called smartcards, also link authentication and encryption to the physical device, with these being based on personal encryption keys stored in the card. If such a device were also to get into the hands of an unauthorised person, there is a risk that the encryption key may be exposed, thus allowing others to claim rightful ownership of the device.

Alternative solutions on the market store sensitive information in a central unit instead of in the portable device. The weakness of such a solution is that it requires a secure online connection to the central unit. This may be costly and may also introduce new security risks. In addition, it would be very serious for such a system if the central unit were to be subjected to a successful attack on security and so corrupt all central information.

The object of the present invention is to provide a system and a method for digital authentication, encryption and signing, which system increases the security for the user by never storing sensitive information such as identity, unique codes or encryption keys, thus making it harder for this to end up in unauthorised hands.

This is provided by means of a system, a portable device and a method respectively, of the type mentioned by way of introduction, the characteristics of which are stated in Claims 1, 11 end 16 respectively. Further characteristics of the invention are stated in the remaining dependent claims.

With the present invention, temporary but consistent and repeatable digital keys are generated. The keys are connected uniquely to each user, and are generated by means of a set of input parameters (of which one parameter is typically a biometric input). The keys are never stored, but exist in a temporary memory only for as long as they are required, which with today's technology may mean a fraction of a second.

The keys generated may be used for a number of purposes, including but not limited to:
  authentication
  encryption
  digital signing Keys are here taken to mean one or more digital numerical codes of an arbitrary length.

Encryption keys are taken to mean any form of means that may be used to render a message indecipherable for a third party and which may be used to make a message readable to an authorised person.

A message or a document should here be interpreted in the widest possible sense, as any form of information to be sent from a sender.

Authentication is taken to mean that the user is somehow identified as being the person he/she claims to be.

Digital signing means using keys connected to one's identity in order to sign a digital document and assume the same obligations as those entailed by signing a paper version of the same document with a pen.

Biometric input means any form of input that may identify a person, such as fingerprints, retina, DNA, facial topography and voice; but other biometric characteristics that are unique to a person but which have so far not been used commercially, may also be implicit in the term.

2 COMPARISON WITH EXISTING TECHNOLOGIES

On the market and in the literature, there are several known methods of digital authentication, encryption and signing.

Common to conventional encryption methods is the fact that:
  i) the users are allocated secret keys (pre-generated);
  ii) the secret keys are stored in an encrypted state in a local or central storage medium; and
  iii) the user must provide a password or a fingerprint in order to gain access to his/her secret keys every time they are to be used.

The present invention is characterised in that:
  i) the users' secret keys are generated from a set of input parameters linked to each user, typically a combination of biometric inputs, a password and the serial number of a mobile telephone or a smartcard;
  ii) the secret keys are never stored, but generated on-the-fly at the user's initiative;
  iii) the user must produce the correct set of parameters every time the secret keys are to be generated; and
  iv) the keys generated are the save every time, provided the input parameters are the same.

The present invention introduces a system and a methodology for encryption which can be combined with existing standards for Public Key Infrastructure (PKI) and established, recognised methods of encryption, such as RSA, which has the advantage of being based on algorithms and methods that have undergone decades of testing and validation by a unified international scientific community.

Seen in relation to conventional encryption systems, the present invention provides improved security for the user by never storing the secret keys and only allowing the right user to generate them.

Seen in relation to conventional encryption systems that make use of biometry, the present invention introduces the benefit of not needing to store bio-input anywhere, which is essential, among other things with regard to privacy protection.

In the following, a description is given of existing technologies that make use of biometry, but which differ from the present invention.

Authentication by Means of Fingerprints

Several data systems today have a log-in procedure that entails presenting a correct fingerprint in order to gain access to a computer and the associated network resources. This is implemented by each user having a pre-registered "original" or "template" with which the fingerprint presented is compared. If the user presents a fingerprint that is "similar enough", the user is considered to be authorised. The flaw in this method is primarily the fact that bio-input has to be stored, which makes it possible for it to fall into the wrong hands.

Signing of Digital Documents by Means of Fingerprints

Today, all signing of documents takes place by means of pre-generated keys. These are stored in a storage medium, and can only be used by producing the correct password or fingerprint. When the literature states that "a document is signed electronically by means of a fingerprint", this is done by the fingerprint giving access to stored keys, which are then used to sign the document. This method has the following weaknesses:

1. Sensitive bio-input must be stored.
2. The encryption key is stored and therefore open to an attack.

Admission Control by Means of an Electronic Signature

Admission control by means of an electronic signature that links bio-input, user information and hardware attributes, is known from WO-A1 9965175, which describes a system that combines biometric input, user data and hardware ID. A signed combination of all inputs is stored in the hand-held unit. The keys that are used for signing are allocated by means of conventional methods. When a user is to be authorised, all user inputs are retrieved and signed with the allocated key. If the result is similar enough to the stored "original", the user is authorised. This technology was developed in order to verify rightful ownership of a portable device that carries privileges, such as e.g. a key card. By storing bio-information in the card, it becomes possible to confirm the user as the rightful owner of the card. Thus the purpose of this technology is completely different from the present invention.

Biometric Encryption

Mytec Technologies uses biometric inputs to encrypt a pre-generated secret key. The encrypted key is then stored in the portable device. The secret key may be regenerated by presenting the correct biometric input (U.S. Pat. No. 6,219,794 and U.S. Pat. No. 5,680,460). This method has the following weaknesses:

1. Sensitive parts of the bio-input must be stored.
2. The encryption key is stored in an encrypted form, but is open to an attack.

Bodo

A German patent has proposed a method that generates private keys directly from a fingerprint (DE 42 43 908). The proposed method has several weaknesses that render it unsuitable for practical use. Two of the most important weaknesses are:

1 Bodo does not address the problem of how to handle natural variations in the bio-input. This is the fundamental problem that has to be solved for this method. Thus for practical purposes, this method is considered useless (ref. chapter 22 in ICSA Guide to Cryptography, Randall K. Nichols, McGraw-Hill, 1999).
2. The Bodo method is unable to handle compromised keys. A bio-input has a unique connection to a given private key. If the key were to be compromised, its bio-input would not be usable for generation of new and different encryption keys, which is incompatible with international standards for the use of private keys.

3 SYSTEM DESCRIPTION

Figure 2:
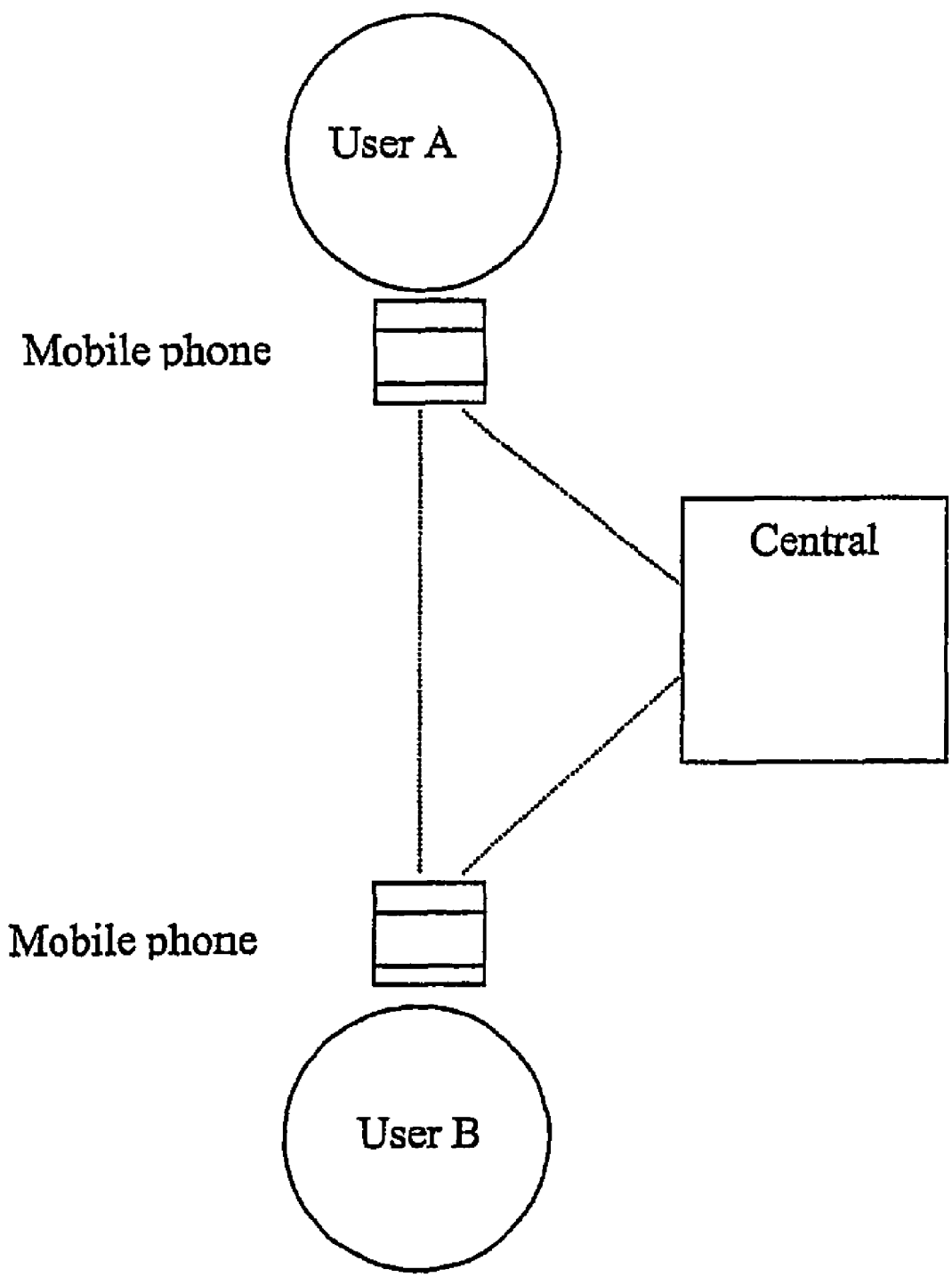
Figure 3:
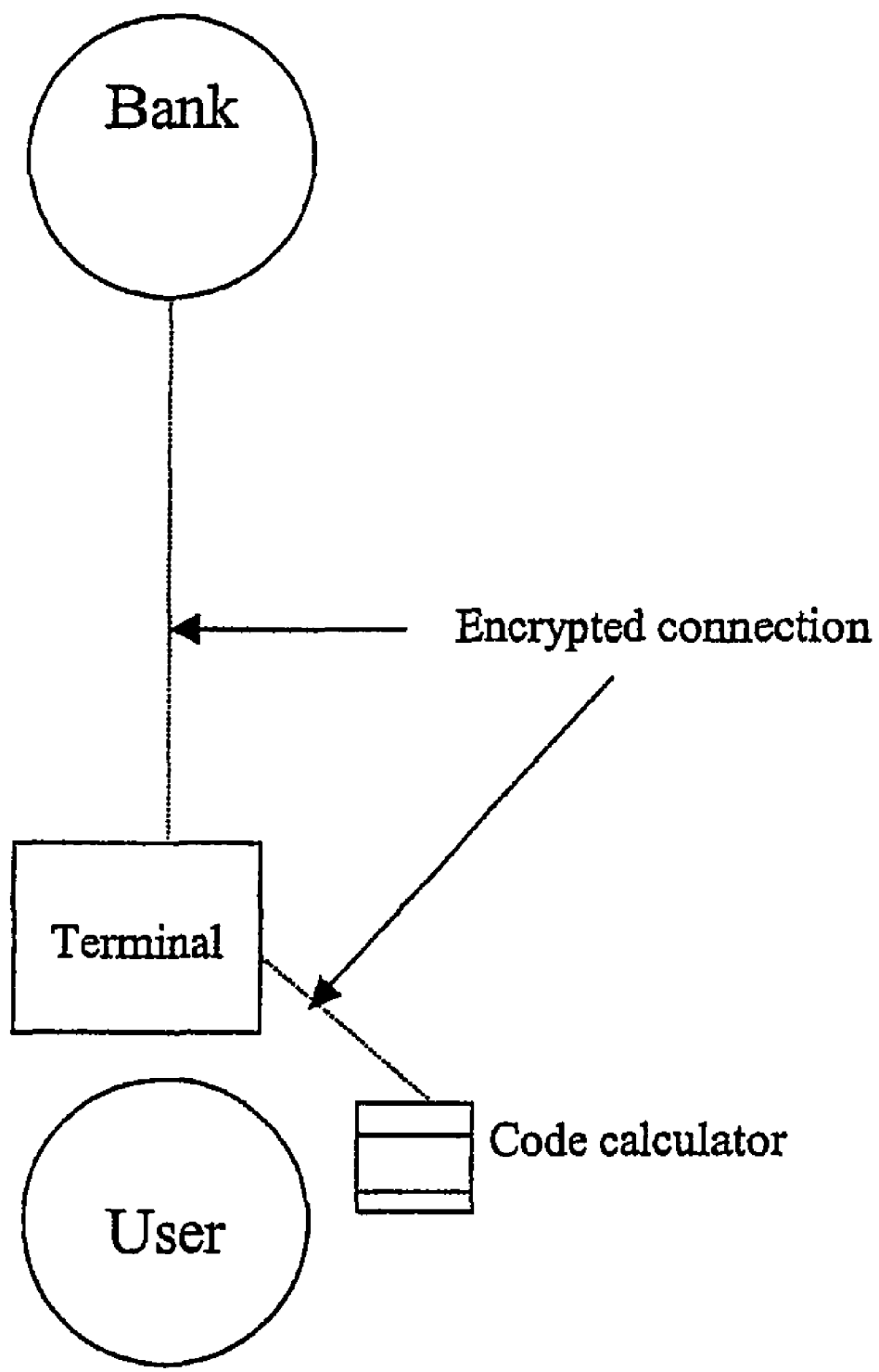

In the following, the invention will be described in greater detail through a description of the system with reference to the figures, in which:

FIG. 1 shows a block diagram of the system for digital authentication, encryption and signing;

FIG. 2 schematically shows an example of digital signing in wireless networks;

FIG. 3 schematically shows an example of a code calculator; and

Figure 4:
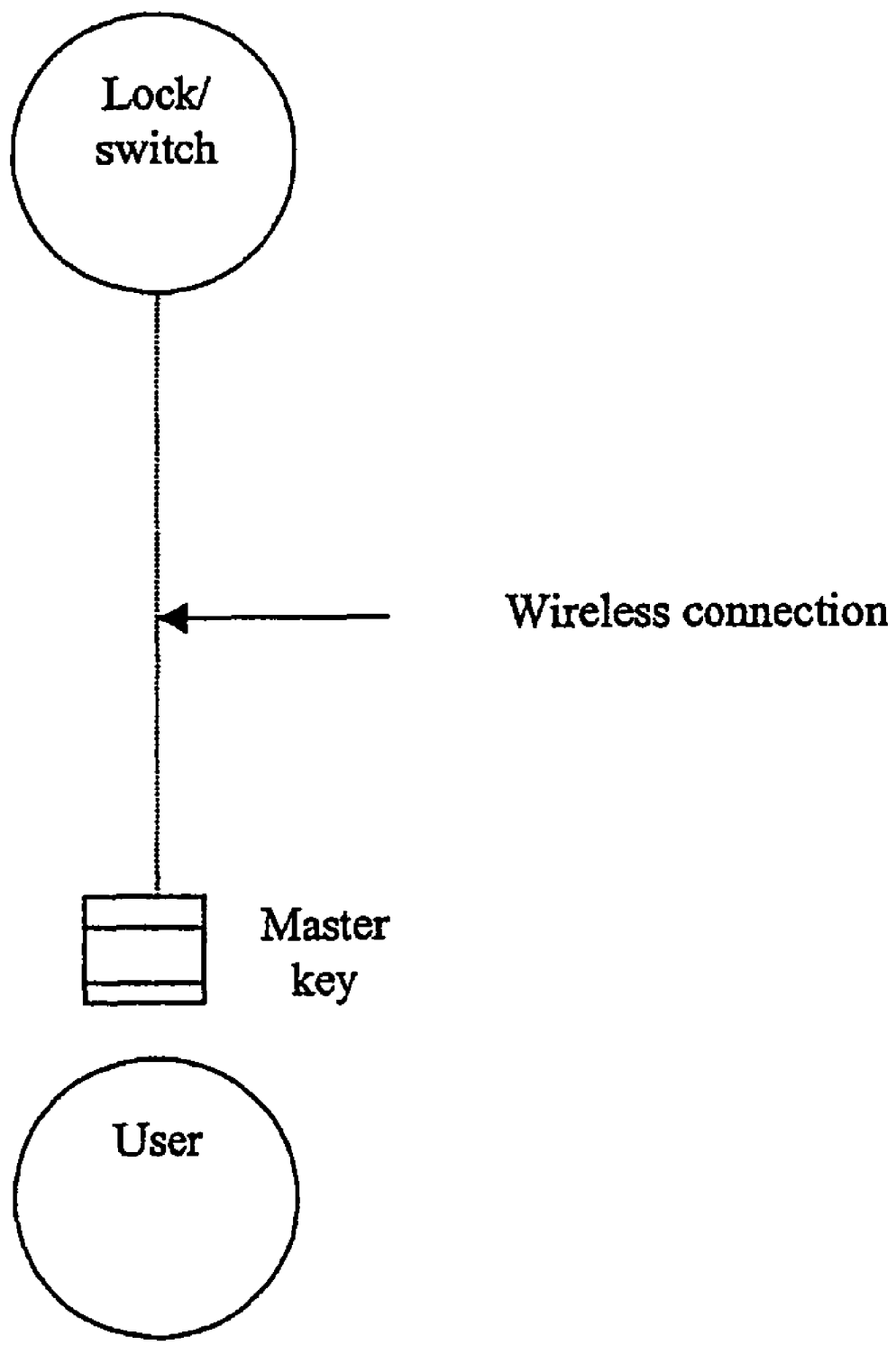

FIG. 4 schematically shows an example of the invention used by an all-around key (master key).

FIG. 1 shows an analogue or digital system that receives user input and through use of software and hardware generates an encrypted and signed message.

The hardware required to implement the solution may be based on existing solutions currently on the market.

Software and algorithms required to implement the solutions may be based on existing known techniques and algorithms.

In the figure, the invention is illustrated in the form of a block/flow diagram that differentiates between input, where the values that form the basis for the generation of encryption keys are input, a hardware/software part HW/SW, and output data, cf. the bottom of the figure.

Input

Reference number 101 denotes a key input. A typical example of such an input may be some form of biometry, such as e.g. fingerprints, voice, retina, iris, DNA or other biometric characteristics.

Reference number 102 denotes an analogue or digital user code. This is typically an alphanumeric password. The user is free to select this, but the same password must be used every time the keys are to be generated.

Reference number 104 denotes a digital document such as defined in chapter 1.

HW/SW

Reference number 105 denotes a sensor, which may be as sensor that is known per se and which can read a key input, typically a biometric input, and convert this into a data format that can be read and used by the device 106 for generation of keys.

Thus the sensor 105 may be one that generates a 3D digital representation of a finger, based on measurements of capacitance.

When using DNA as the biometric data, the device 105 is an analysis device that provides the DNA code of the sample, which can be converted into a data format that may be read and used by the device 106 for generation of encryption keys.

In addition to key input and user code, a system input 103 may be supplied. System inputs are often stored in the system (generally a portable device) during manufacture or through an initiation process. The system input (103) consists of information that is specific to each individual version of the hardware used or is unique to each individual user. Examples of this may be the serial number of a smart card, the PUK code of a mobile telephone, stored random bit string or insensitive user specific information.

The device 106 generates encryption keys at the user's initiative. The generated keys are uniquely connected to input 101, 102, 103 and 105 by:

1. the same keys being generated every time the same set of input parameters are presented, or by
2. the generated keys forming a unique series of numbers, finite or infinite, uniquely determined by the input parameters.

The keys generated in the device 106 are used in a device 107 for digital signing/encryption. A typical example of such signing/encryption would be the RSA public key technology, which at present is considered to be one of the most secure technologies for this.

Output Data

Data 108 transmitted from the hardware device is typically both encrypted and signed. This means that only the recipient should be able to read the message, while at the same time allowing the recipient to verify that the sender is who he/she claims to be.

4 DESCRIPTION OF THE INVENTION

4.1 General Method

The present invention introduces a generic method for generation of encryption keys uniquely connected to each user by means of biometry.

The general method of the present invention is:
a) To define an n-dimensional characteristic vector fq(n) from key input (101), so that fq(n) is unique to each user and repeatable even in the case of natural variations in the analogue input 101.
b) To determine fq(n) from the user's key input.
c) To generate one or more prime numbers uniquely defined by fq(n) and a pre-defined prime number generator G.
d) To determine one or more encryption keys for the user, uniquely defined by function K, using generated prime numbers as input. The function K will be uniquely defined by the type of encryption technology being used.
e) The encryption keys are ready for use.

4.2 Method of Public Key Encryption a) Define an n-dimensional characteristic vector fq(n) from key input (101, so that fq(n) is unique to each user and repeatable even in the event of natural variations in the analogue input 101.
b) User initiation
  1. Determine fq(n) from user's key input.
  2. Generate two prime numbers p and q from a pre-defined prime number generator G. and fq(n) as input.
  3. Determine user's private and public key from a function K and the prime numbers p and q.
  4. Record a connection between the public key and the user in a central register.
c) Application
  1. Determine fq(n) from user's key input.
  2. Generate two prime numbers p and q from a pre-defined prime number generator G and fq(n) as input.
  3. Determine user's private and public keys from a function K and the prime numbers p and q.
  4. The keys are ready for use.

4.3 Extraction of Characteristics

A number of different known methods of extracting characteristics from the key input may successfully be used in the present invention. This includes well known work in the area of fingerprint analysis, as well as conventional techniques from image processing, signal processing, statistics and mathematics.

However, a prerequisite of the present invention is that the natural variations in the analogue input 101 (key input) must not generate different characteristics every time. I.e. the characteristics determined must be consistent and repeatable in spite of natural variations from one sample to the next.

There are two main solutions to this problem. One is to find characteristics that are inherently robust against natural variations in the key input. This is the most demanding way. An alternative is to use a quantification technique in order to convert an analogue signal into a digital, repeatable signal. By achieving this, many more characteristics can be used to implement the present invention. Such a generic quantification technique is described in 4.5.

4.4 Generation of Prime Numbers and Encryption Keys

The general method refers to a prime number generator G. A number of different known prime number generators may be used to implement the present invention. Described below is a simple version of G, which may be used to generate 1024 bit RSA encryption keys.

a) Run fq(n) through a hash function where the output is two unique hash values h1 and h2, both of which have a length of 512 bits.
b) For each of the hash values, look for the nearest prime number by incrementing the hash value by the value of 1 until a prime number has been found. This yields two prime numbers termed p and q.
c) The function K for generation of a public and a private key for RSA is defined by;
  Public key PU=p*q
  Private key PR is a vector with the elements p and q, PR=[p,q]

4.5 Conversion of a Variable Analogue Signal into a Repeatable Digital Signal One of the greatest challenges in all uses of biometry for authentication and encryption is how to convert an analogue and variable input into a repeatable, consistent digital signal without losing the characteristics of the analogue signal. An efficient way of solving this is described below.

Instead of converting the entire key input, e.g, a finger print image, we convert a characteristic vector that represents the most important characteristics of the key input. This characteristic vector is processed according to the method described below, so as to render it robust against natural variations in the key input.

Step 1: Pre-analysis
a) Select n suitable characteristics f(n) of the key input.
b) Perform an analysis of a representative selection of relevant key inputs.
c) For each characteristics, split the sample space into intervals in such a way as to take into account the desire for characteristics from two different key inputs end up in different intervals, while characteristics from the same key input end up in the same interval.

Step 2: User Initiation:
a) Determine a cutting vector fm(n) from m samples of f(n) in user's input
b) Determine a correction vector v(n) in a manner such that each element of fm(n)+v(n) end up in the middle of the nearest interval.
c) Store v(n) in a manner such as to make it available when the user's encryption keys are to be generated.

Step 3: Conversion:
a) Determine f(n) from the key input.
b) determine fv(n)=f(n)+v(n)

c) The converted characteristic vector $fq(n)$ is determined in such a way that each element identifies the interval in which the corresponding element of $fv(n)$ is located.

4.6 Storing v(n)

The method in 4.5 calls for somewhere to store a correction vector $v(n)$ for each user. An obvious place to store this is locally in the portable device, as a system input (103) such as shown in FIG. 1.

Note that $v(k)$ does not contain information that in any way can be used to reconstruct the original key input or the user's encryption key. Thus storing $v(n)$ for those cases where the generated encryption keys are used in a public key regime. Use of the method described below allows $v(n)$ and/or other information of interest to be integrated with the public key without reducing the security in the system. The example below makes use of the RSA public key technique.

Step 1: User Initiation:
  a) Determine $f(n)$, $v(n)$ and $fq(n)$ for the user as above.
  b) The user's private key PR and public key PU are both functions of the prime numbers p and q.
  c) Set the requirements for PU such that a global predefined function Y with PU as the input yields $v(n)$, $Y(PU)=v(n.)$
  d) Determine a prime number p from $fq(n)$.
  e) Select a new prime number q such that $Y(PU)=v(n)$.

Step 2: Generation of Private Keys:
  a) Determine $v(n)$, $Y(PU)=v(n)$.
  b) Determine $f(n)$ from key input (101).
  c) Determine $fq(n)$ from $f(n)$ and $v(n)$ as above.
  d) Determine p from $fq(n)$.
  e) Determine q from public key PU=pq.
  f) User's private key PR=[p,q].

4.7 Stored System Attribute

As described in 3, a stored system attribute is an optional input. The benefit of not using input 103 is that the portable device becomes completely user independent. This is a feature offered by no other conventional methods.

The advantage of the user being dependent on a particular portable device is that the security is increased, as an abuser will actually be dependent on being able to get his hands on the right portable device.

Another benefit of using a stored system attribute in the generation of encryption keys is that the amount of input information increases, which reduces the requirements for unique information in the key input (101).

5 CHARACTERISTICS OF THE INVENTION

5.1 Does not Store Sensitive Information

The strength of the present invention lies in the fact that no sensitive information regarding the user is stored anywhere, neither centrally nor in the portable device. Conventional techniques store information containing:
1. Sensitive information regarding the user's biometry and/or;
2. encryption keys.

Such stored information may be abused in order to find sensitive user biometry or the user's secret keys. The present invention does not store any sensitive information, and is therefore more attractive than those technologies which have so far been known, both when it comes to privacy protection and security.

5.2 User Independent Portable Devices

The present invention allows secure authentication and signing by means of general user independent portable devices.

User independent portable devices may be very useful from a user's point of view. If person A were to lose or forget his portable device, he will still be able to authenticate himself or generate digital signatures by borrowing person B's portable device.

User independent devices can be made on the basis of the system described in 3, by selecting one of the following methods:
1. Use the biometric key input (101) as input to the generation of encryption keys.
2. Use the biometric key input (101) and a system attribute (103) hidden in the user's public key as input to the generation of encryption keys.
3. One of the above alternatives, but where a secret user's code (102) is also used as input to the generation of encryption key in order to further increase security.

5.3 Variable Security Clearance

Using combinations of one or more of the input parameters achieves variable security clearance in one and the same system. This is very useful when it comes to differentiating between tasks with different security requirements. Consequently, the user may only have to present one of the input parameters for simple tasks, while being required to present all the inputs for more demanding tasks.

The different security levels offered are achieved by combining one or more of the input parameters described in 3. The following describes some examples of how the input parameters can be combined.
  Level 1: Stored system attribute, which gives the lowest security.
  Level 2: Alphanumeric code, which gives a security level one degree higher than the lowest level.
  Level 3: Alphanumeric code and stored system attribute, which gives a security level two degrees higher than the lowest security.
  Level 4: Biometric input, which gives a security level three degrees higher than the lowest security.
  Level 5: Biometric input and stored system attribute, which gives a security level four degrees higher than the lowest security.
  Level 6: Biometric input and alphanumeric code, which gives a security level five degrees higher than the lowest security.
  Level 7: Biometric input, alphanumeric code and stored system attribute, which gives the highest security.

Conventional systems are not able to offer a variable security clearance in one and the same system.

5.4 Multiple Digital Key Sets

The system described in 3 is very well suited for multiple key sets connected to each person by varying one of the input parameters. Examples of how such different key sets may be used includes one set being connected to a person as a private individual, another being connected to the user as an employee in a company, and a third being connected to privileges earned in a customer relationship. One or more of these key parameters may also be anonymous in the sense that the user's identity is not directly connected to the key set. This finds several important uses within the area of privacy protection. A concrete example of this would be medical journals.

A user distinguishes between different key sets by varying one or more of the input parameters. An example of this may be for the user to have one password for each key set. Alternatively, the user has one hand-held device for each key set. The user may also vary several of the input parameters simultaneously, for instance by one key set being connected uniquely to the left index finger, password number one and a red hand-held device, while the second key set is connected to the right index finger, password number two and a blue hand-held device.

Conventional systems do not have the same flexibility as the present invention, which would allow them to offer multiple key sets in one and the same system.

5.5 Dynamic Changes in Digital Key Sets

The system described in 3 also allows dynamic changes in a digital key set without requiring the user to go through a new process of registration.

If the user alters the password, the biometric input, the method of extracting characteristics from biometric input, or changes the hardware device, the key will change as a consequence of this.

If the user communicates the change in a secure manner to central servers, the user can dynamically update one or more of his key sets.

A practical use for this is when there is a wish to change one's password. Alternatively, the portable device may be broken, necessitating a replacement.

When changes are communicated centrally, it is obviously important that this be carried out in a secure manner. There are several known techniques that ensure secure updating.

One technique is to have a special secret key that is split up and divided among friends. How many friends this special secret key has been distributed among, and exactly who they are, is only known to the user. Consequently, the user is the only one who can produce the special secret key that is required in order to validate a change in the key set on the central server.

Conventional systems can not offer a dynamic change in key sets, such as offered by the present invention.

6 EXAMPLE SYSTEM—DIGITAL SIGNING IN WIRELESS NETWORKS

This example describes one application of the present invention for digital signing of messages in wireless networks, cf. FIG. 2. The user uses a mobile telephone with an integrated system such as described in FIG. 1, where:

Reference number 101 indicates the placing of the user's right index finger.
Reference number 102 indicates the input of an alphanumerical password.
Reference number 103 indicates the serial number of the mobile telephone.
Reference number 104 indicates input of the message to be signed.
The device 105 is a stripe sensor that generates a 3D fingerprint image based on capacitance measurements.
Block 106 indicates an algorithm for generation of RSA keys. Information is extracted from the fingerprint (3D) through a combination of Wavelet transformation and eigenvalues. This data is used in a prime number algorithm for generating RSA keys.
Block 107 illustrates conventional RSA encryption/decryption.
Block 108 indicates the signed version of the message 104.

All users will initially register their public RSA key in a central server. The public RSA key is generated during registration by means of hardware and software (based on FIG. 1) integrated into the user's mobile telephone. When registering, the user will also produce another form of identification (traditional) in order to prove that he/she is who he/she claims to be.

When registration has been carried out, all users can easily enter into and sign agreements between themselves. For instance, a user may fill in a loan application on the Internet and sign it by moving his finger across the stripe sensor on his mobile telephone. The user's private RSA key is then generated in the device 106, existing for the fraction of a second it takes for the software in the mobile telephone to sign the loan application in the device 107. The application is addressed uniquely to the lender by encrypting it with the lenders public key, which can be found by looking it up in a central server (see FIG. 2).

The wireless connection in FIG. 2 between the mobile telephones and the mobile telephones and the central server may be Bluetooth and/or GSM. The communication across this wireless connection may be protected by means of standard encryption technology such as e.g. Secure Socket Layer (SSL).

The above described system provides much better security than conventional systems. The user's private RSA key is not stored anywhere, and will therefore not get lost even if the user were to lose his mobile telephone. An unauthorised user will find it very costly and demanding to generate the private key. More specifically, it would require access to:
1. The user's fingerprints.
2. The correct 3D image of the user's fingerprints (estimated from 1).
3. The user's password.
4. The serial number of the user's mobile telephone.
5. An algorithm for generating keys.

This makes unauthorised use very difficult.

7 EXAMPLE SYSTEM 2—CODE CALCULATOR

This example describes an application of the present invention which in terms of functionality is similar to today's code calculators used to authorise users for Internet banks, cf. FIG. 3.

All users have a portable device in accordance with FIG. 1, where;
Reference number 101 denotes the user's iris.
Alphanumeric code 102 is not used in this example.
Reference number 103 denotes the serial number of the code calculator.
Reference number 104 in this example denotes alphanumeric challenge from the bank.
The sensor 105 in this case is an iris camera.
Block 106 in this case is a pseudo-random algorithm that generates a unique, finite series of numbers for each set of input parameters.
Block 107 in this example denotes logic that combines the challenge from the bank 104 and block 106 in order to respond to the challenge.
Block 108 in this example denotes an alphanumeric response the challenge 104 from the bank.

All users are initially registered with their bank with a secret series of numbers by means of their hand-held device.

The series of number is generated from a pseudo-random algorithm 106 on the basis of inputs 101-103.

The series of number is not stored anywhere else but in the bank, but is generated on-the-fly by the user in a portable device every time it becomes necessary to authenticate oneself to the bank. This reduces the risk of unauthorised persons gaining access to the user's secret series of numbers.

Authentication of the user takes place through the bank generating random challenges to which only a person with the correct series of numbers has the correct response. A number of methods of doing this are known. One simple example is for the bank to challenge the user to state digit number x, y and z in the user's series of numbers (the bank never requests the same number in the series twice). If the user provides the correct response (output 108), the user is authorised.

The term encrypted connection is taken to mean a fixed or wireless connection encrypted by means of a conventional encryption protocol such as Secure Socket Layer (SSL). The terminal may be a personal computer (PC), a personal digital assistant (PDA), or a mobile telephone. The code calculator may be a hand-held device based on the system described in 1. In the event of the terminal being a PDA or a mobile telephone, the hand-held device may be an integrated part of the terminal.

8 EXAMPLE SYSTEM 3—MASTER KEY

This example describes a portable device, a master key (all-round key) that by use of the user's fingerprints electronically operates electronic locks/switches for which the user is authorised, cf. FIG. 4.

The master key is based on the system described in FIG. 1, where:

Reference number 101 denotes the user's right thumb.
Alphanumeric code 102 and serial number 103 are not used in this example.
Reference number 104 denotes an encrypted challenge from the lock/switch to be operated.
The sensor 105 in this example is a fingerprint sensor.
Block 106 denotes an algorithm for generation of RSA public/private key pairs,
Block 107 denotes a conventional RSA decryption/encryption.
Block 108 denotes an encrypted response to the challenge from the electronic lock/switch.

The master key and the lock/switch to be operated contain a wireless communication module based on technology such as Bluetooth. The lock/switch contains a list of authorised users.

When the user activates the master key by pressing on the fingerprint sensor, the user's public RSA key is transmitted. If the public RSA key matches a registered user in the lock/switch, a random test code is transmitted back, encrypted with the user's public RSA key (104). The user decrypts the test code with his private RSA key and encrypts it with the public RSA key of the lock/switch before returning it (output 108). The lock/switch decrypts the received response with its private RSA key, and if the test code received is correct, the user is authorised.

The master key may be freely shared and used by several persons, but a user will only be able to operate locks for which he/she is authorised, hence the term all-round key, a key for all locks and for all persons.

There is no risk involved if the master key gets into the wrong hands, as it contains no information that specific to the user or the locks/switches for which the user is authorised.

The only way to operate locks/switches for which one is not authorised is to manage to find an authorised user's private RSA key, which will be a very costly and time consuming process.

To further complicate any unauthorised operation of locks/switches, it is possible in the course the process of generation of the user's key pair to also demand a password (102) and/or the serial number (103) of the master key, in addition to the fingerprints (108).

9 APPLICATIONS

The present invention represents a significant innovation by tying biometry and cryptography together in a completely new way. When using the present invention, there is no need to store user sensitive information, which is a benefit both in terms of privacy protection and security.

The present invention is compatible with existing standards of public key infrastructure (PKI), and may therefore be used in all areas where PKI is used or may conceivably be used.

However, the application of the present invention is not limited to the PKI fields of application. The present invention may be used in any situation where some form of authentication is required.

The following is a list of some obvious applications:
electronic transactions
electronic formations of contract
electronic casework
physical admission control (buildings, vehicles and other areas where electronically controlled locks are appropriate)
logical access control (access to computers, networks, privilege-based network services)
electronic identification papers

The invention claimed is:

1. A system for authentication, encryption and/or signing, comprising:
an input device designed by means of a given algorithm to extract predetermined characteristic values from a value input by a user, said value is specific to the user, wherein the predetermined characteristic values supplied exhibit a natural variation, said algorithm is designed to remove the natural variations in the predetermined characteristic values in order to yield an identical set of characteristic values on input of the corresponding predetermined characteristic values; and
a device designed to generate at least one user specific encryption key comprising said characteristic values,
wherein removing said natural variations comprises using a correction vector, said correction vector determined such that a value of a cutting vector corrected by said correction vector is disposed in the middle of a nearest interval.

2. The system of claim 1, wherein said cutting vector is determined from a predetermined number of samples of said predetermined characteristic values.

3. The system of claim 2, wherein said nearest interval comprises at least one of a plurality of intervals determined by splitting a sample space for each of said predetermined characteristic values.

4. The system of claim 1, wherein said correction vector is at least one of generated and stored such that it is available to generate said at least one encryption key.

5. The system of claim 4, wherein the device for generation of said at least one encryption key is given a system input in addition to said user code, so as to increase further the complexity of the input to the generation of the encryption key(s) and consequently the level of security.

6. The system of claim 5, wherein the device for generation of said at least one encryption key from characteristic values generates one or more sets of unique key sets for every user.

7. The system of claim 1, wherein said predetermined characteristic values are corrected by said correction vector to remove said natural variations.

8. The system of claim 7, comprising a converted characteristic value, said converted characteristic value determined such that its value identifies the interval in which a corresponding value of said corrected characteristic values is located.

9. The system of claim 1, wherein the input value consists of biometric data.

10. The system of claim 1, wherein the device for generation of said at least one encryption key includes a prime number generator.

11. The system of claim 1, wherein the device for generation of said at least one encryption key is connected to a device for input of at least one user code, thereby to increase the complexity of the input to the generation of the encryption key(s) and consequently the level of security.

12. A portable device for secure authentication, encryption and/or signing, comprising a system having:
   an input device designed by means of a given algorithm to extract predetermined characteristic values from at least one value input by a user, which values are specific to the user, wherein the predetermined characteristic values supplied exhibit a natural variation, said algorithm is designed to remove the natural variations in the predetermined characteristic values in order to yield an identical set of characteristic values on input of the corresponding predetermined characteristic values; and
   a device designed to generate at least one user specific encryption key comprising said characteristic values,
   wherein it is designed so as on the basis of the input values to produce a user specific signal suitable for identifying the user,
   wherein removing said natural variations comprises using a correction vector, said correction vector determined such that a value of a cutting vector corrected by said correction vector is disposed in the middle of a nearest interval.

13. The portable device of claim 12, wherein the device for generation of said at least one encryption key is connected to a device for input of at least one user code, thereby to increase the complexity of the input to the generation of the encryption key(s) and consequently the level of security.

14. The portable device of claim 12, wherein the input value consists of biometric data.

15. The portable device of claim 12, comprising a stored correction vector.

16. The portable device of claim 12:
   wherein said predetermined characteristic values are corrected by said correction vector to remove said natural variations; and
   comprising a converted characteristic value, said converted characteristic value determined such that its value identifies the interval in which a corresponding value of said corrected characteristic values is located.

17. A portable device that forms a user assigned master key that will operate electronic locks/switches, comprising:
   an input device to the portable device designed to extract predetermined characteristic values from an input value by means of an algorithm, said algorithm is designed to remove the natural variations in the predetermined characteristic values in order to yield an identical set of characteristic values upon input of the same input values; and
   a device in the portable device designed to generate at least one user specific encryption key comprising said characteristic values,
   wherein removing said natural variations comprises using a correction vector, said correction vector determined such that a value of a cutting vector corrected by said correction vector is disposed in the middle of a nearest interval.

18. The portable device of claim 17, wherein the device for generation of said at least one encryption key is connected to a device for input of at least one user code, thereby to increase the complexity of the input to the generation of the encryption key(s) and consequently the level of security.

19. The portable device of claim 17, wherein the input value consists of biometric data.

20. The portable device of claim 17, comprising a stored correction vector.

21. The portable device of claim 17:
   wherein said predetermined characteristic values are corrected by said correction vector to remove said natural variations; and
   comprising a converted characteristic value, said converted characteristic value determined such that its value identifies the interval in which a corresponding value of said corrected characteristic values is located.

* * * * *